No. 787,522. PATENTED APR. 18, 1905.
G. E. MARTIN.
DEVICE FOR TIGHTENING WIRES.
APPLICATION FILED JUNE 7, 1904.
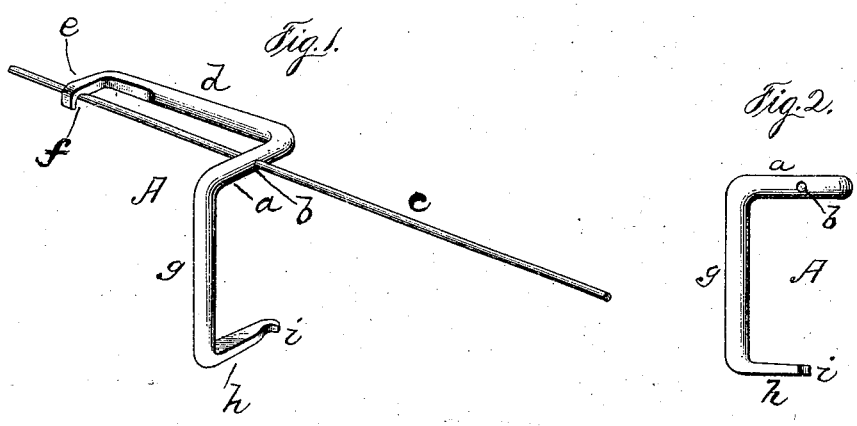

No. 787,522. Patented April 18, 1905.

UNITED STATES PATENT OFFICE.

GARLAND E. MARTIN, OF NORFOLK, VIRGINIA.

DEVICE FOR TIGHTENING WIRES.

SPECIFICATION forming part of Letters Patent No. 787,522, dated April 18, 1905.

Application filed June 7, 1904. Serial No. 211,485.

*To all whom it may concern:*

Be it known that I, GARLAND E. MARTIN, a citizen of the United States, residing at Norfolk, in the county of Norfolk and State of Virginia, have invented new and useful Improvements in Devices for Tightening Wires, of which the following is a specification.

This invention has relation to improvements in devices for tightening wires; and it consists in the novel construction and arrangement of a tightening implement whereby the brace-wires of a bedstead, or line-wires of a wire fence are drawn and kept taut, all as will be hereinafter more fully explained, and particularly pointed out in the appended claim.

The annexed drawings, to which reference is made, fully illustrate my invention, in which—

Figure 1 represents a perspective view of my device. Fig. 2 is an end view of the same.

Referring by letter to the accompanying drawings, A designates the tightening implement, consisting of an angular bar comprising a transverse horizontal portion $a$, having a perforation $b$, through which the tightening-wire $c$ is passed, and said implement has a horizontal portion $d$ at right angles to the transverse portion and parallel with the wire, as shown in Fig. 1 of the drawings.

At the end of the portion $d$ and extending inwardly at right angles thereto is a short arm $e$, having a hooked end $f$, that engages the wire, and extending downward and at right angles to the transverse portion $a$ is a vertical arm $g$, which is bent at its lower end into a right-angular short arm $h$, having a hooked end $i$.

It will be readily observed from the above description, when taken in connection with the annexed drawings, that in tightening the wires the operator turns the implement, when the wire is engaged or caught by the hooked ends and twisted or wrapped and the wire held taut.

Having thus described my invention, what I claim as new, and desire to secure by Letters Patent, is—

A wire twister and holder comprising a horizontal bar, a vertical bar, and a transverse connecting-bar having a central perforation; the ends of the vertical and horizontal bars being bent inward and provided with the hooked ends, the whole formed integral, substantially as described.

In testimony whereof I have signed my name to this specification in the presence of two subscribing witnesses.

GARLAND E. MARTIN.

Witnesses:
  WM. H. BATES,
  A. M. BUNN.